United States Patent
Coleman et al.

(10) Patent No.: US 6,200,189 B1
(45) Date of Patent: Mar. 13, 2001

(54) POP DANCERS

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 0 days.

(21) Appl. No.: 09/414,591

(22) Filed: Oct. 8, 1999

(51) Int. Cl.[7] ................................................ A63H 3/28
(52) U.S. Cl. .......................... 446/298; 446/298; 446/297; 446/404; 446/73; 40/414
(58) Field of Search .................. 446/73, 77, 72, 446/81, 236, 404, 175, 397, 297, 298; 40/411, 414, 415

(56) References Cited

U.S. PATENT DOCUMENTS 4,169,335 * 10/1979 Betancourt .
4,294,035 * 10/1981 Klein .
4,563,162 * 1/1986 Ishimoto ............................... 446/175
4,889,027 * 12/1989 Yokoi .................................... 446/175
4,978,030 * 12/1990 Morris et al. ............................ 221/3
4,983,890 * 1/1991 Satoh et al. ............................. 318/3
5,176,560 * 1/1993 Wetherell et al. .................... 446/175
5,417,605 * 5/1995 Chan ..................................... 446/136
5,536,054 * 7/1996 Liaw ..................................... 446/236
5,681,200 * 10/1997 Schecter ................................. 446/76
5,683,762 * 11/1997 Banshick ................................. 428/4
5,735,726 * 4/1998 Cohen ................................... 446/298
6,004,597 * 12/1999 Coleman et al. ..................... 426/112

* cited by examiner

Primary Examiner—Sam Rimell
(74) Attorney, Agent, or Firm—Melvin L. Crane, Agent

(57) ABSTRACT

The pop dancers consist of a main housing with a slide switch, microphone, speaker, integrated circuit board, contact switch, a gearing system, and a motor. The lower end of the main housing contains the power supply. The upper end of the main housing has a tube anchor with a drive rod, outer tube, candy stick holder, flexible/bendable character with an aperture and candy with a candy stick.

6 Claims, 4 Drawing Sheets

POP DANCERS

This invention is directed to a candy holder designed to combine music and motion of an object which gives children a new concept for eating candy.

BACKGROUND OF THE INVENTION

Heretofore various means have been patented by applicants for consumption of a candy pop in combination with some active means for movement of the candy pop for pleasure of a consumer.

More specifically, the following U.S. patents are directed to motion drive devices: U.S. Pat. Nos. 2,003,765; 4,983,890; 2,846,222; 4,889,027; 5,040,319; 4,169,335; 2,788,608, 5,259,806; 5,221,225; and 4,931,029. These patents in some way provide music and/or movement with music.

OBJECTS OF THE INVENTION

It is therefore an object of the invention to provide a musical device in combination with an active dancer which may be activated by a person while consuming a candy pop and/or by dispensing small pieces of candy from a reservoir for consumption during motion of an object and with music.

Other objects and advantages will become obvious to those skilled in the art from a review of the drawings, specification and claims.

DETAILED DESCRIPTION

Figure 1:
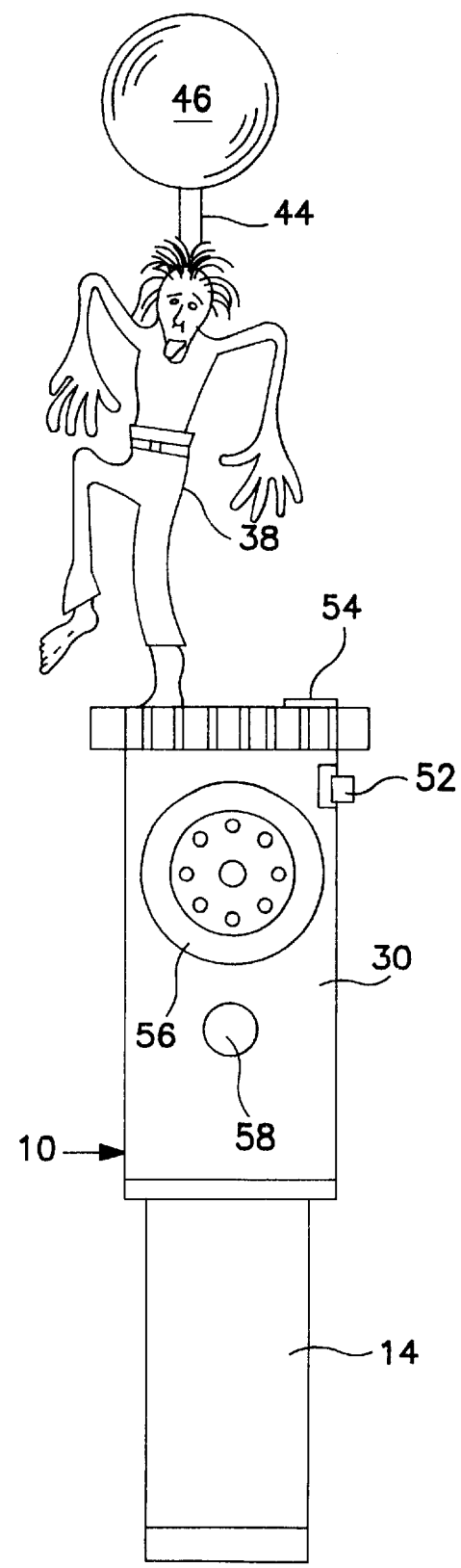
FIG. 1 is a front view of pop dancer and holder in combination with a candy pop.
Figure 2:
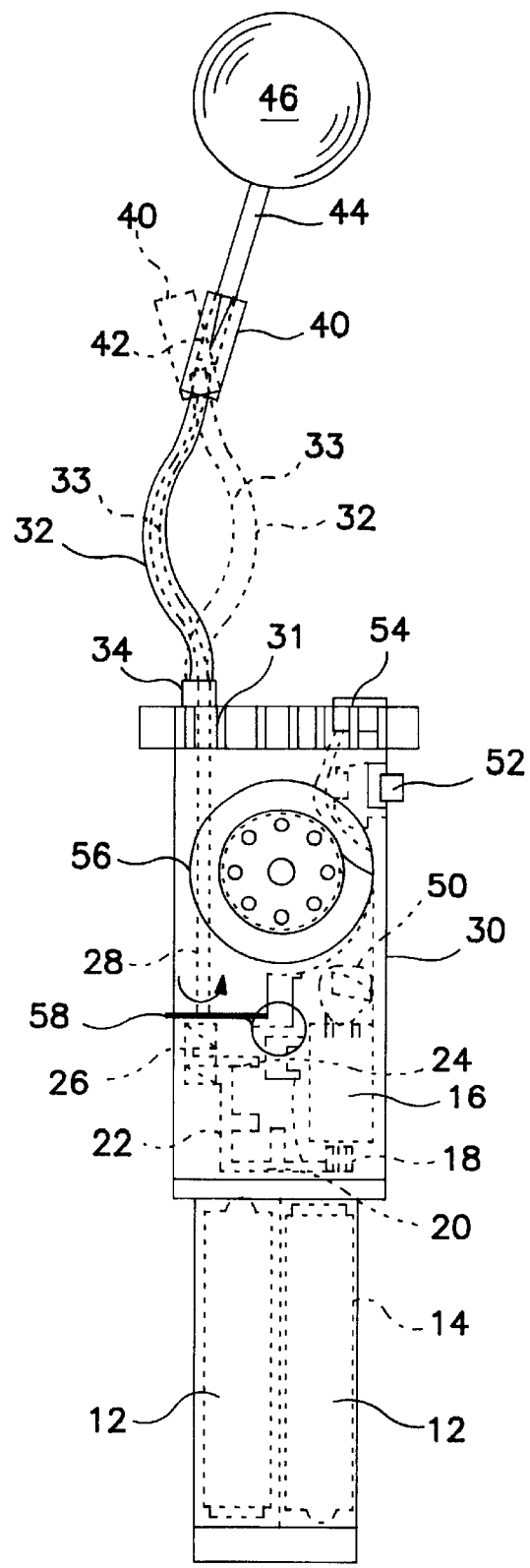
FIG. 2 is a view similar to FIG. 1 illustrating a dancer removed from the motion drive rod with the motion drive rod, motor, gearing, and music sounding means shown in dotted lines.

Now referring to the drawings wherein the same reference character in each of the drawings refers to the same part throughout the drawings, there is shown in FIG. 1 a front view of a pop dancer device. The device includes a housing 10 including batteries 12 or a power supply in a lower compartment 14. The batteries supply power to a motor 16 which includes a primary gear 18. The drive gear 18 drives secondary gears 20, 22, and 24 which in turn drives a second drive gear 26 that drives a rigid drive shaft 28 in a main housing 30.

The rigid drive shaft 28 extends from the main housing in a bearing 31 and includes a curved portion 33 that passes through an outer flexible tube 32 which is anchored by an anchor 34 at its lower end to the main housing. The rigid curved drive shaft 33 and the outer tube 32 pass through an aperture 36 in the pop dancer 38 whose bottom foot is anchored to the outer tube. A portion of the rigid drive shaft that passes through the pop dancer is bent so that as the shaft is rotated, the bent portion rotates in a circle which causes movement of the pop dancer. The upper end of the outer tube is provided with a candy stick holder 40 which has an aperture 42 to which a candy stick 44 is secured. A candy pop 46 is provided on the candy stick for consumption by a user.

Figure 4:
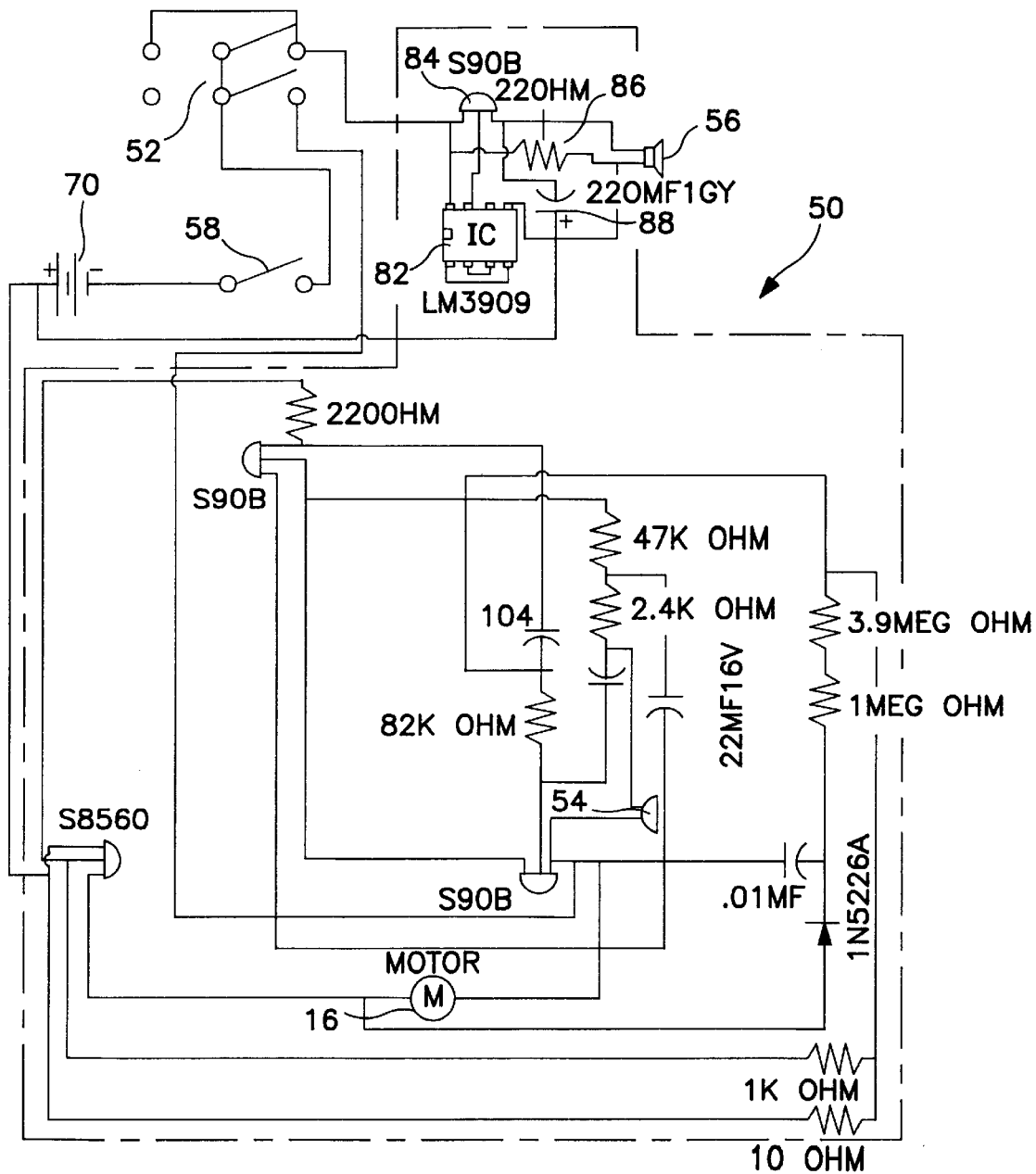
FIG. 4 illustrates the electrical circuit for operating a motor that drives the mechanical gears, etc. and the circuit in combination for producing music during operation of the device.

The main housing includes an integrated circuit board 50 which includes a circuit shown in FIG. 4 to operate the motor and music section. The music section includes the integrated circuit board 50, a double pole slide switch 52, a microphone 54 and a speaker 56. The circuit is also provided with a contact switch 58 for controlling the power to the microphone or the speaker by the circuit. Operation of the microphone or the speaker depends on the position of the slide switch.

Figure 3:
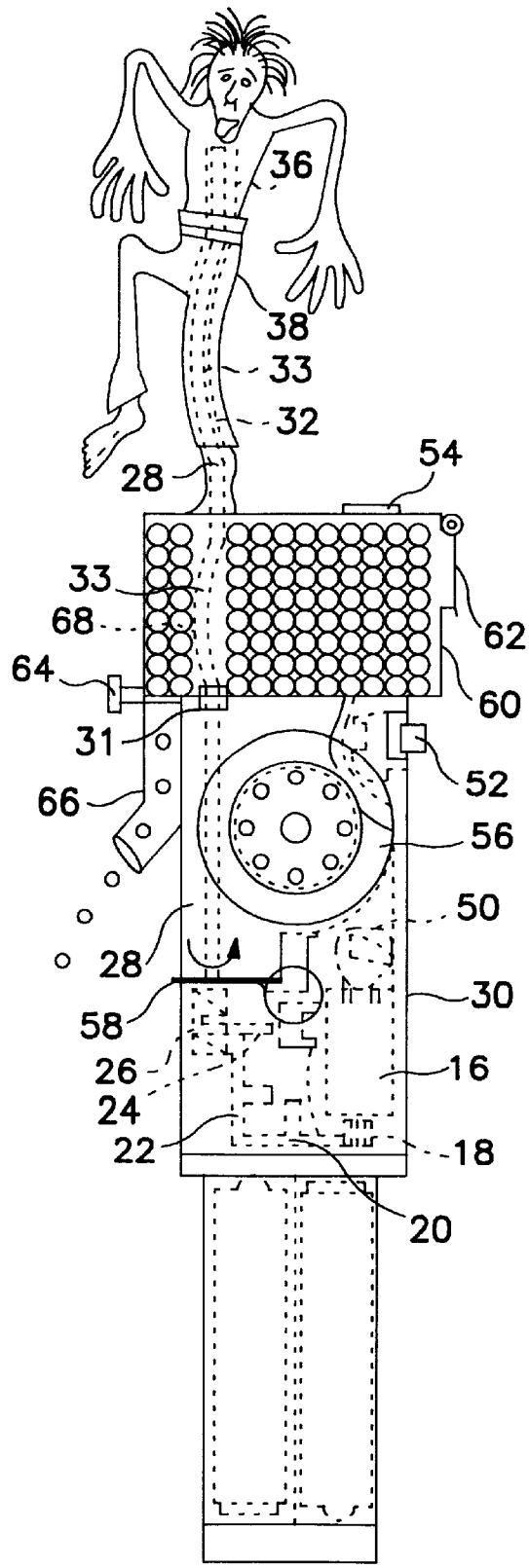
FIG. 3 illustrates a modification of the device shown in FIG. 2 including a reservoir holder-dispenser between the dancer and the drive mechanism.

FIG. 3 illustrates a modification which includes a reservoir 60 which has a refill door 62, a dispensing means 64, and a dispensing spout 66 through which candy pieces pass. As shown in FIG. 3, a curve portion 33 of the drive shaft passes through the reservoir and is bowed or curved in the area of the reservoir. As the drive shaft is rotated, the bowed section 68 rotates in a circle within the reservoir and moves the candy pieces so that they will pass through the dispensing spout provided the dispensing button has been pulled to open the dispensing spout. The motor, music, and operation of the pop dancer is the same as set forth above with the foot of the pop dancer secured to the upper end of the reservoir. Since the drive shaft is rotated by the motor and is formed with curved portions, the curved portions will move in a circle and will make the pop dancer dance and the candy in the reservoir to move and be dispensed through the dispensing spout or chute.

FIG. 4 illustrates a schematic circuit diagram for operation of the microphone 54, the motor 16 and the speaker 56. As shown, the circuitry includes a power supply 70, and a contact switch 58 for activating the circuit for operation of the parts. The contact switch is connected with a double pole slide switch 52 which controls a motor 16 via a microphone 54 that receives music from an outside source and by operation of the microphone, circuitry connected with the microphone activates the motor to operate the gears 18, 20, 22, 24, and 26 and rigid drive shaft 28 which controls the pop dancer 38 in accordance with the music input via the microphone. The circuitry including the microphone and motor includes appropriate transistors, capacitors, and resistors as shown in the drawings. By movement of the slide switch to a second position a circuitry includes an integrated circuit 82 which has been programmed to provide different music, a transistor 84, a resistor 86, a capacitor 88 and a speaker 56 provides music from within the device which is heard outside by a user. In this position, the slide switch also operates the motor for controlling the gears and rigid drive shaft which controls the pop dancer. In the modification shown in FIG. 3, candy can be dispensed from a reservoir by rotation of the rigid drive shaft portion within the reservoir.

To activate the pop dancer, press the contact switch 58. This allows the power to engage the circuit board and turns the microphone on to receive any outside music or sounds. As music or sound enters the microphone, the motor reacts by turning the gears, which then move the drive rod inside the outer tube in a circular motion. The character, candy and stick holder connected to the outer tube dances or moves to the sound or music received through the microphone. When the slide switch on the main housing is moved to another position and the contact switch is pressed, the pop dancer operates off of internal music or sound supplied by the circuit board.

From the above description and illustrative drawings, it would become obvious that a different circuitry could be provided which would carry out the invention. Thus, applicants are not bound by an exact circuitry.

The foregoing relates to preferred exemplary embodiments of the invention, it being understood that other variants and embodiments thereof are possible within the spirit and scope of the invention, the latter being defined by the appended claims.

We claim:

1. A candy holder which combines music and motion of an object comprising a main housing, said main housing including therein an electrical power source, a switch for controlling said power source, a double pole switch having first and second positions for controlling different first and second electrical circuits in said housing, a microphone, an integrated circuit board which controls said microphone to receive music and other sounds from outside said housing, an electric motor in said housing, with said double pole switch in the first position, said microphone reacts to said music and sounds to activate said electric motor, said electric motor rotates a gear train in said housing, a rotatable curved drive rod extends from said housing and is connected at one end to said gear train in the housing and said gear train rotates said drive rod, a flexible tube is fixedly connected to an upper end of said housing and surrounding said drive rod, said flexible tube extends through an animated object with a first end of said animated object secured to an upper end of said housing and to a first end of said flexible tube, whereby said animated object moves to the sound of music received by said microphone due to rotation of said drive rod within said flexible tube, said housing includes therein a speaker connected with said integrated circuit board, with said double pole switch in the second position, said integrated circuit supplies music and sounds which are produced by said speaker, and said motor rotates said gear train to rotate said curved drive rod whereby said animated object moves with the sound and/or music from said sneaker.

2. A candy holder as set forth in claim 1, in which a lollipop stick with a lollipop thereon is inserted into a second end of said flexible tube and is connected with the second end of said flexible tube for movement therewith.

3. A candy holder as set forth in claim 1, in which a lollipop stick with a lollipop thereon is inserted into a second end of said flexible tube and is connected with the second end of said flexible tube for movement therewith.

4. A candy holder as set forth in claim 1, in which said housing includes a reservoir on an upper end thereof, said reservoir includes a fill door for adding candy to the reservoir and an output spout through which candy is dispensed, and said curved drive rod extends through said reservoir and said animated object whereby candy can be dispensed from said reservoir and said animated object moves to the sounds and/or music.

5. A candy holder as set forth in claim 3, in which said housing includes a reservoir on an upper end thereof, said reservoir includes a fill door for adding candy to the reservoir and an output spout through which candy is dispensed, and said curved drive rod extends through said reservoir and said animated object whereby candy can be dispensed from said reservoir and said animated object moves to the sounds and/or music.

6. A candy holder which combines music and motion of an object comprising a main housing, said main housing including therein an electrical power source, a switch for controlling said power source, a double pole switch having first and second positions for controlling different first and second electrical circuits in said housing, a microphone, an integrated circuit board which controls said microphone to receive music and other sounds from outside said housing, an electric motor in said housing, with said double pole switch in the first position, said microphone reacts to said music and sounds to activate said electric motor, said electric motor rotates a gear train in said housing, a rotatable curved drive rod extends from said housing and is connected at one end to said gear train in said housing and said gear train rotates said drive rod, a flexible tube is fixedly connected to an upper end of said housing and surrounding said drive rod, said flexible tube extends through an animated object with a first end of said animated object secured to an upper end of said housing and to a first end of said flexible tube, whereby said animated object moves to the sound of music received by said microphone due to rotation of said drive rod within said flexible tube, said housing includes a reservoir on an upper end thereof, said reservoir includes a fill door for adding candy to the reservoir and an output spout through which candy is dispensed, and said curved drive rod extends through said reservoir and said animated object whereby candy can be dispensed from said reservoir and said animated object moves to the sounds and/or music.

* * * * *